United States Patent [19]  [11] 3,928,406
Leeper et al. [45] Dec. 23, 1975

[54] PLANT GROWTH REGULANT COMPOSITIONS AND METHODS

[75] Inventors: Robert W. Leeper, Chalfont; Paul Strohm, Philadelphia, both of Pa.

[73] Assignee: Amchem Products, Inc., Ambler, Pa.

[22] Filed: Apr. 4, 1973

[21] Appl. No.: 347,736

[52] U.S. Cl. ........... 260/448.8 R; 260/340.7; 71/79; 71/88
[51] Int. Cl.$^2$ .................... C07F 7/04; C07F 7/18
[58] Field of Search .................. 260/448.8 R, 340.7

[56] References Cited
UNITED STATES PATENTS

| | | | |
|---|---|---|---|
| 2,682,512 | 6/1958 | Agre | 260/448.8 R X |
| 3,053,873 | 9/1962 | Pepe | 260/448.8 R X |
| 3,231,594 | 1/1966 | Speier | 260/448.8 R X |

*Primary Examiner* — Paul F. Shaver
*Attorney, Agent, or Firm* — Ernest G. Szoke; Michael E. Zall; Howard S. Katzoff

[57] ABSTRACT

Compounds of the type
$$Cl-CH_2CH_2-Si\ O(CH_2CH_2O)_2CH_2CH_3$$
are disclosed.

5 Claims, No Drawings

PLANT GROWTH REGULANT COMPOSITIONS AND METHODS

The present invention relates to composition and methods for regulating the growth of plants. And particularly, this invention concerns 2-haloethyl silanes and the use of compounds to induce, among other responses, but not limited thereto, growth regulating responses which are ethylene or ethylene-type responses.

The induction of an ethylene response in plant growth by other means has been known for some time in the art. See, for example, "Plant Biochemistry" by James Bonner and J. E. Varner (1965), pages 641 to 664.

The particular mechanism by which ethylene affects the growth of plants is not understood and has only recently been the subject of any intensive investigation. However, it is clear that ethylene plays an important role in regulating or participating in plant growth processes. It will be seen that the 2-haloethyl silanes of this invention contain in their structures molecular configurations which are capable of breaking down in such a way as to release ethylene, although there is no intention to limit the present invention to this or any other theory.

The use of certian other silane compounds outside the scope of the present invention for the purpose of modifying certain aspects of plant growth is known in the agricultural art.

In U.S. Pat. No. 3,183,076 the use of chloromethy-, 1-chloroethyl- and various other alkoxysilanes for accelerating fruit maturity, defoliation and for herbicidal use is disclosed.

U.S. Pat. Nos. 3,390,976 and 3,390,977 together disclose halomethyl-alkoxysilanes used as herbicides.

In an article entitled "Some Herbicidal Silicon Compounds", by J. K. Leasure and J. L. Speier, J. Med. Chem., 9,949 (1966), the herbicidal use of several haloalkyl-silanes is described.

In contrast to the prior art just described, the present invention involves inducing a plant growth regulating response or an ethylene-type response through the application of compounds at the plant site having the following generic formula:

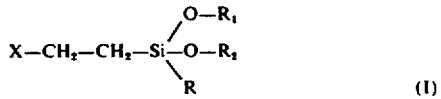

(I)

wheein X is chlorine or bromine; R is chloro-, alkyl, phenyl, chlorophenyl, benzyl, chlorobenzyl or the radical $-OR_3$; and wherein $R_1$, $R_2$ and $R_3$ are each independently selected from the group consisting of polyether of the formula $-(C_nH_{2n}O)_yR_4$ wherein $n = 2$ or 3, $y$ may be any integer from 2 to 100, and $R_4$ is a terminal group selected from the group consisting of hydrogen, alkyl, phenyl, chlorophenyl, benzyl and chlorobenzyl;

and ketal.

It will be understood that the polyether substituent will be basically either a polyoxyethylene or a polyoxypropylene substituent with the indicated terminal groups, depending on $n$ being either 2 or 3, respectively. While virtually any number of basic repeating polyether units are possible, giving an extensive polymer chain substituent, the preferred range of size in terms of number of basic repeated units has been found to be between 2 and 20, and most preferably between 2 and 10.

By ketal is meant any reaction product of ketones and polyhydric alcohols. The term polyhydric alcohol is understood to mean an alcohol having two or more hydroxyl groups.

Silane compounds of the present invention which have also been found capable of inducing a plant growth regulating response or an ethylene or ethylene-type response through application at the plant site, are those having the following generic formula:

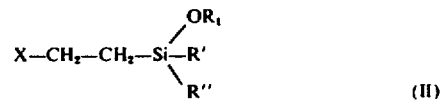

(II)

wherein X is chlorine or bromine; $R_1$ has the same meaning as set forth above; and R' and R" are each independently selected from the group consisting of alkyl, phenyl, chlorophenyl, benzyl and chlorobenzyl.

The silane compounds of this invention will be better understood from the following description of preferred methods of preparation of the compounds, specific examples of which methods are set out further below. It is understood, however, that this is exemplary only, and that the present invention is to be taken in its broadest sense, and not necessarily limited in terms of the reactants, reaction temperature and pressure conditions, residence times, separation techniques and other method parameters by which the compounds of the present invention are prepared.

The silane comounds of the present invention which are comprised in part by the structural unit which may be represented as Si—O—R, wherein R is defined as $R_1$ above, may be prepared by the reaction of 3 moles (stoichiometric) of an hydroxyl compound having the desired R entity with one mole (stoichiometric) of 2-chloroethyltrichlorosilane. The desired reaction product is formed and hydrogen chloride is liberated. This preparation method may be represented generally as follows:

$ClCH_2CH_2Si(OR)_3 + 3HCl$

It will be noted that in this instance all of the bondings of groups to the silicon atom comprise the structural unit: Si — O — R.

The preparation method jsut described may be performed in a solvent medium. In such event, however, the hydrogen chloride gas which is evolved must be effectively removed. Thus, it has proven advantageous to vary the method by replacing the solvent medium with a tertiary amine such as pyridine, which is able to act as both a medium for the reaction, and as an effective hydrogen chloride acceptor. The hydrogen chloride salt of pyridine is formed readily, allowing the reaction to go to completion. It will be understood that other tertiary amines may be employed as well, for example, N,N-alkyl substituted anilines, pyridine derivatives and trialkylamines.

Another variation of the preparation method described above which has proven advantageous is one in which an excess of the hydroxyl compound reactant is employed as a medium for the reaction. Thus, for example, methanol, ethanol and so forth, may be used both as the reactant materials and, supplied in excess, are effective media in which the reaction may proceed readily.

Other silane compounds of the present invention have been described which are comprised in part by the structural unit which may be represented as Si — R, wherein R is defined as alkyl, phenyl, chlorophenyl, benzyl or chlorobenzyl. A compound of this invention having the indicated structural unit may be prepared by first reacting magnesium with R — Br, where R is defined as set out immediately above. This reaction gives the product R—Mg—Br. This reaction product is in turn reacted with 2-chloroethyl-trichlorosilane to give a compound of this invention which is comprised in part of the structural unit: Si—R. It will be understood that this method is a conventional Grignard synthesis, and that by regulating preparation method conditions it is possible to obtain good yields of the products:
$ClCH_2CH_2—SiRCl_2$ and $ClCH_2CH_2—SiR_2Cl$.

It will be further understood that these reaction products may be employed themselves as reactants in the first preparation method described above, whereby the $SiCl_2$ or $SiCl$ portion of the product reacts with an hydroxyl compound to give the basic structural unit: Si — O — R, wherein R is derived from the hydorxyl compound ROH, and is defined as $R_1$ in the generic formula I. By using these preparation methods just described in sequence, it is thus possible to produce any desired combination of the basic structural units: Si — O — R and Si — R in a single silane compound. All of these compounds, of course, will contain the moiety $XCH_2CH_2—$, wherein X is bromo- or chloro-, as defined in the generic formulas I and II above.

In order that this invention may be better understood with respect to the silane compounds of Formulas I and II wherein $R_1$ and/or $R_2$ and/or $R_3$ are defined as "ketal", a general method of preparation for such compounds will be described.

Merely by way of example, and without any intention of thereby limiting the broad definition of "ketal" as set out above, such a substituent may be prepared by reacting acetone with 1,1,1-trimethylolethane according to the following reaction:

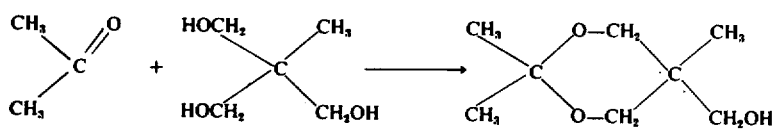

The reaction product will be seen to be an hydroxyl compound which may be employed as a reactant with 2-chloroethyl-trichlorosilane to give a silane compound of this invention which is comprised in part of the structural unit: Si — O — R, according to the preparation method described above. It will also readily be seen that many such ketal derivatives may be produced as the reaction products of various ketones with various polyhydric alcohols. All such derivatives are within the scope of this invention.

The silane compounds of the present invention have been found to exhibit a wide variety of plant growth regulating properties or ehtylene-type responses, depending upon the concentration used, the formulation employed and the type of plant species treated. While the compounds of the present invention may be viewed as producing an ethylene or ehtylene-type response, there is no intention to so limit the invention, since it is considered that certain growth regulating responses achieved through the practice of this invention may not be regarded, in a technical or traditional sense, as known or yet to be discovered ethylene or ehtylene-type responses. Thus, it is preferred to regard the results achieved in the practice of the present invention as growth regulating responses.

In view of the foregoing, it can be seen that the term "method for regulating plant growth" or the term "growth regulation process" or the use of the words "growth regulation" or other terms using the word "regulate" as used in the specification and in the claims mean a variety of plant responses which attempt to improve some characteristic of the plant as distinguished from herbicidal action, the intention of which is to destroy or stunt a growth of a plant. For this reason the compounds and their use in the practice of this invention are in such amounts that they are non-phytotoxic with respect to the plant being treated.

Despite this fact, the silane compounds of this invention can sometimes be used in a herbicidal context, for example, to stimulate the growth of dormant rhizomes in order to make such rhizomes more susceptible to a herbicide. However, in such a context the silane compounds of the present invention are not themselves in any practical sense herbicides since they promote the growth of the unwanted plant or otherwise make it susceptible to a true herbicide. Thus, the present invention can be carried out in conjunction with or in the presence of other compounds or mixtures which are herbicides.

By virtue of the practice of the present invention a wide variety of plant growth responses, generally ethylene responses or ethylene-type responses have been achieved, including the following: inhibition of terminal growth and control of apical dominance with an increase in branching; abscission of foliage, flowers and fruit; hastening of ripening and color promotion in fruit; acceleration of senescence or ripening of leaves; induction of flowering and fruiting; and increasing the latex flow of rubber plants.

It will be apparent that other plant growth responses which are ethylene or ethylene-type responses may be achieved with equal facility by virtue of the practice of the present invention. Such responses would include, for example, the following: increasing yields; auxin activity; changing bio-chemical compositions of the plant; abortion of inhibition of flowering and seed development; prevention of lodging; stimulation of seed germination and breaking of dormancy; resistance to freeze injury; resistance to plant disease; hormone or epinasty effects; and interactions with other growth regulators.

A further description of some of the aspects of these various plant growth responses will permit a better understanding of the present invention.

Inhibition of terminal growth and control of apical dominance has been produced in privet (*Ligustrum ovalifolium*).

While removal of the top or apical bud by mechanical means should in theory permit growth by the lateral or auxiliary buds, it has been found that when the apical bud is removed that one of the auxiliary buds often takes over the activity and therefore the dominance of the apical bud. However, it has been found that use of the silane compounds of the present invention usually retards the activity of the apical buds for a time, but then later allows restoration of apical bud function and growth. Thus, it is possible to avoid the permanent loss of buds inevitably associated with mechanical removal.

The silane compounds of this invention have been found to accelerate the abscission of mature foliage in cotton (*Gossypium hirsutum*). This is obviously of benefit as an aid to mechanical harvesting of cotton. Abscission of fruit following application of the silane compounds of the present invention has been observed in apples (*Malus domestica*).

Hastening of ripening of fruit has been produced using the silane compounds of this invention in green fruit from tomato plants (*Lycopersicon esculentum*) and in green fruit of banana (*Ananas comosus*). It is also useful to employ the silane compounds of this invention to achieve color promotion in fruit which, although ripe, retains green coloring. Thus, this invention is beneficial in removing the green color from harvestable fruit and regreened fruit such as citrus fruit, for example, lemons and oranges.

The practice of this invention has proven useful in accelerating the maturity or senescence of crops harvested for their leaves, particularly tobacco. The silane compounds of this invention have been found to be effective for this purpose whether applied to the leaves before harvesting or soon after harvesting of the leaves.

Suitably applied, the silane compounds of this invention are capable of increasing flowering and fruiting in a number of economic crops. It has been possible to achieve 100% flower induction in pineapple (*Ananas sativus*) using the silane compounds of this invention.

The silane compounds of this invention have proven useful in stimulating the production and flow of various fluid components of plant systems which are transported throughout the plant. Some of these are of considerable economic importance, such as the sap derived by tapping maple trees, turpentine collected from pine trees, and latex collected from rubber trees. It has been found that through the practice of this invention a dramatic increase in the yield of latex from rubber trees may be achieved.

The silane compounds of this invention are capable of increasing yields of many plants, particularly, for example, small grains and various bean plants.

The silane compounds of this invention exhibit traditional auxin activity. For example, they are capable of inducing bending of a plant hypocotyl away from the side of application; they induce sprouting of underground rhizomes in both monocotyledonous and dicotyledonous plants; and they cause cell proliferation.

The biochemical composition of plants can be altered by applying to the plants, even after harvest of the plants or a portion thereof, effective amounts of the silane compounds of this invention. These modifications of the biochemical content of plants include, but are not limited to protein, carbohydrate, sugar, fat and nicotine content.

Application of the silane compounds of this invention will induce rigor resulting in firmer and stronger plants capable of resisting natural tendencies toward lodging.

The silane compounds of this invention produce hormone or epinasty effects on various plants, including notably tomatoes (*Lycopersicon esculetum*).

It is possible to use the silane compounds of this invention in conjunction with other plant growth regulators, such as maleic hydrazide, N-dimethyl-aminosuccinic acid, naphthaline acetic acid and naphthalene acetamide, gibberellic acid, 3-indoleacetic acid, 3-indolebutyric acid, and 2-chloroethylphosphonic acid.

The silane compounds of this invention may be used to promote disease resistance through increasing plant tissue resistance to invasion by plant pathogens by influencing the enzyme and other plant physiological processes which regulate natural disease immunity.

The silane compounds of this invention are viscous, high boiling liquids which will usually not distill without degradation. They are relatively insoluble in water, but can be dissolved in most organic solvents, including ketones, alcohols, hydrocarbons, chlorinated hydrocarbons and aromatic solvents. These silane compounds decompose rapidly on addition of alkali to yield ethylene gas.

When used as plant growth regulators, the silane compounds of this invention are preferably formulated with a suitable carrier or diluent or some combination of these. Such carriers or diluents are materials which can be organic or inorganic, naturally occuring or synthetic, with which the active ingredient is in some manner incorporated, to facilitate its storage, transport, handling and application to the plants to be treated. The carrier material can be either solid or fluid and is preferably chemically and biologically inert. When the carrier material is a solid, it is preferably in particulate, granular or pelletized form, but other shapes and sizes may perform equally well. These solid carrier materials may be naturally occurring minerals which have been prepared for use by grinding, sieving, purification and other treatments. Representative suitable mineral materials include the natural clays, for example attapulgus, kaolin and bentonite clays; mineral silicates such as mica, vermiculite, talc and pyrophyllite; minerals in their natural forms as they are obtained from the earth, for example, quartz, diatomaceous earth, fuller's earth, chalk, rock phosphates and sulfates, calcium carbonates, and silica. Synthetically produced solid carrier materials, for example, synthetic hydrated silica oxides, precipitated calcium silicate and synthetic magnesium silicate can also be used. The material can also be an elemental substance such as sulfur or carbon, preferably activated carbon.

Suitable solid carrier materials include organic flours, for example, wood, walnut shell, soybean, cottonseed, and tobacco flours, and free-flowing hydrophobic starches.

Fluid carriers can be liquids, for example water, or a vaporous or gaseous material. Such carriers can be solvents or nonsolvents for the active material.

The carrier can be mixed or formulated with the active material during its manufacture or at any stage subsequently. The carrier can be mixed or formulated with the active material in any proportion depending on the nature of the carrier. In addition, two or more carriers can be used in combination.

The silane compounds of this invention can be concentrates containing, for example, from about 5 to about 90% by weight of the active ingredient. These concentrates can be diluted with the same or different carrier to a concentration suitable for application. The compositions of this invention may also be dilute compositions suitable for application. In general, concentrations of about 0.1 to about 10% by weight of active material based on the total weight of the composition are satisfactory, although lower and higher concentrations can be applied if necessary.

The compounds of this invention can also be formulated as solutions of the active ingredient in an organic solvent or mixture of solvents, such as for example alcohols; ethers; ketones, especially acetone; hydrocarbons and chlorinated hydrocarbons; aromatic solvents, especially xylene; and so forth.

The silane compounds of the present invention can also be formulated as emulsifiable concentrates which are concentrated solutions or dispersions of the active ingredient in an organic liquid, preferably a water-insoluble organic liquid, containing an added emulsifying agent. These concentrations can also contain a portion of water, for example, up to about 50% by volume, based on the total composition, to facilitate subsequent dilution with water. Suitable organic liquids include those selected from the group of organic solvents for the silane compounds of this invention set out above.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a non-aqueous phase.

The emulsifying agent can be any suitable anionic or non-ionic surfactant or a mixture of these two types of surfactants. Examples of such mixtures are blends containing three parts of the calcium salt of myristyl-benzene sulfonic acid to one part of the oleate ester of a polyoxyethylene glycol (mol. wt. 350), or seven parts of the calcium salt of laurylphenolsulfonic acid to three parts of mono- or di-resin acid esters of polyoxyethylene glycol (mol. wt. 500). Other non-ionic surfactants which are commonly blended with the anionic surfactants set out above include polyoxyethylene sorbitan monolaurate. Complex ether alcohols and various phosphate esters have also been found to be useful. Other suitable emulsifying agents will readily suggest themselves to those skilled in the art. The emulsifying or surface active dispersing agents are generally employed in the liquid compositions in the amount of from 1 to 20 percent by weight of the total composition weight.

Where application of the silane compounds of this invention are required to be topical, that is, applied to a specific situs of the plant and to remain there for a relatively extended period of time, it has been necessary to provide a thickened formulation of the silane compounds. One suitable thickened formulation can be achieved by admixing with any of the silane compounds of this invention a stearate, such as, for example, calcium stearate. Another suitable thickened formulation has been achieved through the use of a heteropolysaccharide gum produced by the fermentation of a carbohydrate by the bacterium *Xanthomonas campestris*. To the mixture of any silane compound of this invention and the heteropolysaccharide gum is added a solvent and water in sufficient quantities to produce the desired concentration of active ingredient, as well as the desired qualities of viscosity and stability. Suitable solvents include, among others, ethanol, butyrolactone and xylene. To this basic formulation may be added such adjuvants as lipids; for example palm oil; anti-oxidants; bacteriostats and bark penetrants.

It will be understood that since the silane compounds of this invention are liquids, that they may be applied directly to plants for the purpose of achieving plant growth regulator responses, without the necessity of having added thereto any other material or materials, such as have been described above.

It will be well understood by any plant biologist that, as with any plant-growth regulator, the silane compounds of this invention should be applied to any particular plant at certain optimum application rates, either of concentration in solution, or of weight per unit ground area, and at certain stages in the growth cycle of the plant, if they are to achieve any particular desired plant growth regulating effect. The almost limitless variety of plant species and the great diversity of desirable plant responses, together with the fairly wide range of climatic conditions which may be encountered, make it altogether impossible to specify exact application rates for all purposes. Such application rates can, however, be determined fairly readily for any particular case by standard procedures well known in themselves. Generally, when applied broadcast to standing vegetation, the application rate for the plant growth regulating compositions of this invention will normally lie within the range of from 0.1 to 100 pounds per acre. It will be understood that the silane compounds of this invention vary considerably in molecular weight, particularly in view of such possible substituents as the polyether groups. Thus, the amount of the silane compounds required for equivalent growth regulator activity, in terms of weight per unit of ground area, will represent a substantial range of values. When applied on a weight amount per individual plant basis, the application rate for the plant growth regulators of this invention will normally lie within the range of 10 to 3000 mg. per individual plant. When applied by drenching trees or soaking seeds or tubers the application rate for the plant growth regulators will normally lie within the range of from 1 to 50,000 parts per million (ppm.). Further detailed guidance in relation to a variety of commerically - important agricultural uses will be found hereinafter.

It cannot be absolutely excluded that upon application of the silane compounds of the invention in say aqueous solution they sometimes breakdown outside the plant, while still in the aqueous solution in which they were applied, and the ethylene thus released is assimilated by the plant in gaseous form - but this seems very improbable, since even when stabilized against hydrolytic breakdown the silane compounds according to the invention will to a greater or lesser extent exert plant growth regulating activity when applied to plants, as demonstrated for instance by epinasty tests upon tomato plants.

It is therefore believed that the silane compounds of this invention exert their growth regulating activity, at least in the great majority of cases, by assimilation into the metabolic system of the plant.

It should be clear that it is a virtually impossible task to assay even one of the silane compounds of this invention for growth responses in every existing plant species. However, as will be seen from the many examples which follow, the present invention has been tested on many plant species for different growth responses. Nevertheless, there is no intention that this invention be limited to the species and responses set forth, as in the future, workers in the art may find the present invention to be an effective growth regulant on other plants and for the growth responses.

However, it should readily occur to one skilled in the art that the recognition of improved results using the compounds of the present invention in connection with other plants, seeds, fruits and vegetables not specifically set forth herein is readily within the abilities of one skilled in the art.

GROWTH INHIBITION

EXAMPLE 1

In this evaluation privet plants (*Ligustrum ovalifolium*) were sprayed with particular silane compounds of this invention at the indicated rates in pounds per acre. The materials were formulated as aqueous suspensions for spraying at 100 gallons per acre on a single plant basis. The privet plants were in 8 inch black plastic pots and were started by cutting and after establishment were prumed to single stems. The treatments were made on the 25th of May and readings were made on August 2. The results are summarized below.

| Test Compound | Rate lb/A | Number of Basal Shoots No. | Growth Per Shoot Cm. | Main Trunk Growth Cm. | Percent of Check (Unsprayed) Basal Shoots % | Growth Per % | Inhibition of Main % * |
|---|---|---|---|---|---|---|---|
| Check | 0 | 3.75 | 13.7 | 37 | | | |
| 2-chloro-ethyl-tris-[2-(2-methoxy-ethoxy)ethoxy]-silane | 50 | 1.3 | 29.8 | 17 | 35 | 217 | 54 |
| 2-chloro-ethyl-tris-{2-[2-(2-ethoxyethoxy)ethoxy] ethoxy}-silane | 70 | 6.4 | 11.6 | 16 | 160 | 85 | 58 |

* % inhibition = 100 − (treated growth × 100 ÷ check growth).

The data set out under percent growth inhibition of the main trunk is the main indicator of activity. However, a high precentage of basal shoots relative to the check and a low percentage of growth per shoot (for all shoots) is also indicative of activity and modifies to some extent the percent growth inhibition value.

FRUIT ABSCISSION

EXAMPLE 2

In this test red delicious apple trees on dwarfing stock Malling-9 were sprayed on September 14 with a back pack sprayer adjusted for a rather coarse hollow cone spray. The foliage was sprayed to run-off with 3.5 to 4 liters of spray solution made up from an emulsifiable concentrate of the silane compound to give a concentration of 1050 ppm. of silane compound in the total spray solution.

Readings were taken at intervals of 4, 6, 8 and 11 days for redness (subjective 0-10 scale), abscission (pull force gauge in grams) and ripeness (a cone point of about 100 microns radius reading in grams at skin penetration). On the eleventh day, the trees were shaken equally and final readings of number of fruit dropped to total fruite borne were taken. The results of these tests are summarized below.

| Treatment | Subjective Ripeness Rating Days: | | | | Ripeness-Pressure Test Grams | Pull Force Required for 2 Fruit -Grams Days | | | | Dropped Fruit % |
|---|---|---|---|---|---|---|---|---|---|---|
| | 4 | 6 | 8 | 11 | | 4 | 6 | 8 | 11 | |
| Check | 0 | 0 | 0 | 3 | 120 | +* | +1440+ | | | 69 |
| 2-chloroethyl-tris-{2-[2-(2-ethoxy-ethoxy) ethoxy] ethoxy}-silane | 1 | 3 | 4 | 5 | 90 | | +1250+280 | | | 70 |

*+ = indication that full scale force required at minimum

FOLIAGE ABSCISSION

EXAMPLE 3

Cotton plants were sprayed in duplicate with several silane compounds at the indicated rates on June 2. The spray solutions were made up using the indicated concentration of active ingredient, with the carrier being 50% acetone, 50% water and 0.1% Tween-20 surfactant, which is a polyoxyethylene/sorbitan monolaurate mixture available from Atlas Industries, Wilmington, Del. Evaluations were made on June 26. A summary of the results are set out below.

| Treatment | Concentration ppm. | Percent Defoliation I | II | Ave. |
|---|---|---|---|---|
| Check | | 0 | 20 | 10 |
| 2-chloro-ethyl-tris-[2-(2-methoxy-ethoxy)ethoxy]-silane | 15000 | 30 | 0 | 15 |
| 2-chloroethyl-tris-{2-[2-(2-ethoxyethoxy) ethoxy] ethoxy}-silane | 21700 | 20 | 10 | 15 |

FRUIT RIPENING

EXAMPLE 4

Green tomato fruit from Pixie Hybrid tomato plants grown in the greenhouse were treated with spray solutions which contained the indicated concentrations particular silane compounds of this invention. Treatments were made on July 14 and evaluations were made daily and concluded on July 31. These evaluations are summarized in the data set out below.

| Treatment | Concentration ppm. | Number of Days from Treatment Until Pink | | | | Average Days |
|---|---|---|---|---|---|---|
| | | I | II | III | IV | |
| Check | 0 | 14 | — | — | —* | 19 |
| 2-chloroethyl-tris-[2-(2-methoxy-ethoxy)ethoxy]-silane | 18800 | 9 | 9 | 10 | 11 | 10 |
| 2-chloroethyl-tris-{2-[2-(2-ethoxyethoxy)ethoxy] ethoxy}-silane | 26000 | 7 | 7 | 11 | 9 | 11 |

*— = indication that fruit still green and taken to be 20 days calculation of the mean.

EXAMPLE 5

Green untreated banana fruit were sprayed to run-off (usually 5 ml.) with test solutions of particular silane compounds of the present invention. The solvent-carrier system employed 0.1% of Tween-20 surfactant with 4.0% acetone. Five banana fruit were employed for each test and spraying was done with a handgun atomizer. As each fruit showed induction to true yellow the lapsed days were noted. The experiment was terminated in 10 days. The results of the experiment are summarized below.

| Treatment | Concentration ppm. | Days to Ripen for Each Fruit | | | | | Average Days to Ripen |
|---|---|---|---|---|---|---|---|
| | | I | II | III | IV | V | |
| Check | 0 | —* | — | — | — | — | — |
| 2-chloroethyl-tris-[2-(2-methoxyethoxy)ethoxy]-silane | 6200 | 4 | 4 | 4 | 4 | 4 | 4.0 |
| 2-chloroethyl-tris-{2-[2-(2-ethoxyethoxy)ethoxy] ethoxy}-silane | 8800 | 4 | 4 | 4 | 4 | 4 | 4.0 |

*— = Not yet ripening in 10 days.

TOBACCO LEAF RIPENING

EXAMPLE 6

In this evaluation Xanthii variety air cured tobacco plants in 8 inch plastic pots in the greenhouse were topped and sprayed with 20 ml. of test solution having the indicated amount active ingredient. The test solution contained the indicated amount of silane compound with the carrier being 10% of acetone, 0.1% Tween-20 surfactant, and the remainder water. The plants were sprayed on November 19 and evaluated on Novemeber 23. The data derived from these evaluations is set out below.

| Treatment | Rate Mg./Plant | Ratio of Ripe Leaves to Total Each Plant | | | Ave. % Ripe Leaves |
|---|---|---|---|---|---|
| | | I | II | III | |
| Check | 0 | 3/8 | 0/10 | 1/11 | 14 |
| 2-chloroethyl-tris-[2-(2-methoxyethoxy)ethoxy]-silane | 940 | 3/13 | 7/10 | 0/13 | 28 |
| 2-chloroethyl-tris-{2-[2-(2-ethoxyethoxy)ethoxy] ethoxy}-silane | 1320 | 2/9 | 2/10 | 5/14 | 27 |

FLOWER INDUCTION

EXAMPLE 7

This test was replicated on 3 pineapple plants. Twenty ml. of test solution was poured into the heart of each plant. All of the test solutions were made up with 0.1% Tween-20 surfactant and 10% acetone in water, with the concentration of silane compound being as indicated. The treatment were made on December 16 and the evaluations were made on February 1. The data gathered from these evaluations is presented blow.

| Test Compound | 60 ml. Amount per Plot mg. | Ave. % of Plants Induced |
|---|---|---|
| 2-chloroethyl-tris-[2-(2-methoxyethoxy)ethoxy]-silane | 900 | 100 |
| 2-chloroethyl-tris-{2-[2-(2-ethoxyethoxy)ethoxy] ethoxy}-silane | 900 | 100 |

LATEX FLOW STIMULATION

EXAMPLE 8

The rubber plant variety used for this test was PB-86, which had been planted in 1958. The tapping was done on Panel C using an S/2, d/2 tapping system. An area one inch below the tappinng cut was lightly scraped and 2 grams of each formulation per tree was painted on this scraped area with a small brush. Each treatment was replicated on 3 trees. The silane compounds were specially formulated to produce a paint-like material by employing palm oil, propylene glycol, ethanol, water and a heteropolysaccharide gum thickener.

A total of 4 pre-treatment tappings were made on April 3, 5, 7 and 9. The treatment applications were made on April 11. A total of 4 post-treatment tappings were made on April 14, 16, 19 and 23. A single collection was made from the pre-treatment tappings approximately 3 hours after the trees were tapped. Two latex collections were made from the post-treatment tappings; the first collection was made approximately 3 hours after tapping and the second collection was made 2–3 hours later. The data from this test is summarized below as the average ml. of latex per tree for 3 replications over the 4 tappings before and after treatment.

| Treatment | Amount mg./tree | Ave. Ml. Latex/Tree Pre-Treatment | Post-treatment | % of Pre-Treatment |
|---|---|---|---|---|
| Check (scrapped) | 0 | 67 | 61 | 91 |
| Check (not scrapped) | 0 | 70 | 68 | 97 |
| 2-chloroethyl-tris-[2-(2-methoxyethoxy) ethoxy]-silane | 1250 | 76 | 126 | 166 |
| 2-chloroethyl-tris{2-[2-(2-ethoxyethoxy) ethoxy] ethoxy}-silane | 1740 | 73 | 165 | 226 |

The Examples set out above are merely illustrative of the wide range of plant growth responses which can be achieved in a variety of plant species using the silane compounds of the present invention. It will be realized that essentially similar effects can be secured with other silane compounds disclosed herein, particularly those specifically identified. It will be expected in such a case, of course, that the rate of application may require appropriate adjustment.

EXAMPLE 9

Preparation of 2-chloroethyl-tris-{2-[2-(2-ethoxyethoxy) ethoxy] ethoxy}-silane 73 grams of 2-chloroethyl-trichlorosilane and 250 ml. of xylene were added to a one liter three-neck flask fitted with a stirrer, reflux condenser and an addition funnel. Ethoxytriglycol, 197.3 g., was added slowly while the temperature was maintained at 40°–50° C. After the addition was complete, the mixture was refluxed with stirring for 2 hours. The hydrogen chloride gas which was evolved during the course of the reaction was removed through the top of the condenser and washed using a water scrubber. The xylene solvent was first removed by distillation, and then the unreacted ethoxytriglcol was removed by distillation at 70°–73° C. at 0.25 mm Hg. vacuum. The yield of the reaction product was 191.3 g., or 83% yield. The refractive index of the reaction product was determined and was found to be 1.4528 ($n_{25}{}^D$).

EXAMPLE 10

A. Preparation of 2,2,5-trimethyl-5-m-dioxane methanol

A well stirred mixture consisting of 30 g. 1,1,1-trimethylolethane (0.25 mole), 36.7 ml. acetone, 160 ml. benzene and 0.5 g. p-toluenesulfonic acid was refluxed for 8 hours using a Dean-Starke trap to collect the water formed during the course of the reaction. 5.6 ml. of water was collected. The excess acetone and benzene were removed by distillation. The residue was distilled under high vacuum. The reaction product distilled at 58°–62° C. at 0.25 mm. Hg. The refractive index was determined and found to be 1.4492 ($n_{30}{}^D$). The yield of reaction product was 23.3 g., which was a 58% yield.

B. Preparation of 2-chloroethyl-tris-[(2,2,5-trimethyl-5-m-dioxane) methoxy]-silane 2.0 g. (.01 mole) of 2-chloroethyl-trichlorosilane and 2.4 g. (.03 mole) of pyridine were added slowly to a well stirred solution of 2,2,5-trimethyl-5-m-dioxane-methanol in 100 ml. of toluene. The addition of pyridine was carried out in such manner that it slightly lagged the addition of the 2-chloroethyl-trichlorosilane. A white solid precipitated from the solution. After the additions were complete the reaction mixture was stirred for ½ hour. The pyridine hydrochloride formed was removed by filtration, and the solvent, toluene, was removed by distillation, first at atmospheric pressure, and then under vacuum. The residue which remained was a viscous liquid. The structure of the reaction product was confirmed by means of infrared analysis, the data from which is as follows: $CH_3$—1360 cm$^{-1}$: Si-O—1200 and 1000 cm$^{-1}$.

EXAMPLE 11

A. Preparation of 2-chloroethyl-diphenyl-chlorosilane 7.3 g. magnesium and 12 g. bromobenzene were added to 50 ml. of anhydrous diethyl ether. A crystal of iodine was added and the ether began to reflux. After the reaction had started, 35.1 g. of bromobenzene was added slowly allowing gentle reflex of the reaction mixture. After the addition was complete the mixture was refluxed for ½ hour. 500 ml. of hexane was added, followed by the slow addition of 24.3 g. of 2-chloroethyl-trichlorosilane. This mixture was refluxed with stirring for 4 hours, cooled, then filtered to remove the inorganic magnesium salts which had been formed. The solvents were removed by distillation and the last traces by flash evaporation. The residue was distilled under reduced pressure (1 mm. Hg.) at 98°–110° C. The yield of reaction product was 7 g.

B. Preparation of 2-chloroethyl-diphenyl-methoxysilane 1.5 g. of 2-chloroethyl-diphenyl-chlorosilane, prepared as set out in A. immediately above, was added to 10 ml. of methanol. The mixture was evaporated to dryness yielding 1.2 g. of a viscous liquid. The reaction product was analyzed using infrared, which yielded the following data: Aromatic C=C—1580 and 1460 cm$^{-1}$; SiO — 1100 cm$^{-1}$.

The Table immediately following contains, merely by way of example, certain specific silane compounds within the scope of this invention. Such exemplification is in no way intended as a limitation of the broad scope of this invention as defined in the claims.

TABLE I $$X-CH_2CH_2-Si\begin{array}{c}OR_1\\OR_2\\OR_3\end{array}$$

| X | $R_1 = R_2 = R_3$: | b.p.°C | Refraction Index $n_{25}^D$ | IR |
|---|---|---|---|---|
| Cl | $CH_3OCH_2CH_2OCH_2CH_2-$ | viscous liquid | — | SiO-1100 |
| Cl | $CH_3CH_2O(CH_2CH_2O)_2CH_2CH_2-$ | — | 1.4519 | SiO-1100 |
| Cl | $HOCH_2CH_2O(CH_2CH_2O)_5CH_2CH_2-$ | — | 1.4570 | OH-3350 SiO-1100 |
| Cl | $HOCH_2CH_2O)CH_2CH_2O)_{12}CH_2CH_2-$ | — | 1.4662 | OH-3350 SiO-1100 |
| Cl | $CH_3OCHCH_2OCHCH_2-$<br>       $\|$        $\|$<br>      $CH_3$   $CH_3$ | — | 1.4393 | SiO-1100 |
| Cl | $Cl-\langle C_6H_4\rangle-OCH_2CH_2OCH_2CH_2-$ | — | 1.5480 | Ar.C=C-1515-1460<br>$C_6H_4O$-1240<br>SiO-1100 |
| Cl | $HO(CH_2CHO)_6CH_2CH-$<br>         $\|$         $\|$<br>       $CH_3$   $CH_3$ | — | 1.4490 | OH-3650<br>$CH_3$-1360<br>SiO-1140<br>-1010 |
| Cl | $CH_3OCH_2CH_2O(CH_2CH_2O)_5CH_2CH_2-$ | — | 1.4605 | SiO-1100 |
| Cl | $CH_3\!\!>\!\!C\!\!<\!\!\begin{array}{c}O-CH_2\\O-CH_2\end{array}\!\!>\!\!C\!\!<\!\!\begin{array}{c}CH_3\\CH_2-\end{array}$<br>$CH_3$                                            | viscous liquid | — | $CH_3$-1360<br>SiO-1200<br>-1000 |
| Cl | $CH_3\!\!>\!\!C\!\!<\!\!\begin{array}{c}O-CH_2\\O-CH_2\end{array}\!\!>\!\!C\!\!<\!\!\begin{array}{c}H\\CH_2-\end{array}$<br>$CH_3$ | — | — | SiO-1100 |
| Cl | $HOCH_2\!\!>\!\!C\!\!<\!\!\begin{array}{c}CH_3\\CH_2-\end{array}$<br>$HOCH_2$ | viscous liquid | — | |

| X | $R_1 = R_2$: | $R_3$: | b.p.°C | $n_{25}^D$ | IR |
|---|---|---|---|---|---|
| Cl | $CH_3-$ | $HO(CH_2CH_2O)_6CH_2CH_2-$ | — | 1.4652 | OH-3300<br>SiO-1100 |
| Cl | $\langle C_6H_5\rangle-CH_2-$ | $CH_3CH_2O(CH_2CH_2O)_2CH_2CH_2-$ | — | 1.5070 | SiO-1100 |
| Cl | $\langle C_6H_5\rangle-O-CH_2CH_2-$ | $CH_3CH_2O(CH_2CH_2)_2CH_2CH_2-$ | — | 1.5216 | Ar.C=C-1518<br>-1480<br>C-C-1240<br>SiO-1100 |

TABLE II $$X-CH_2CH_2-Si\begin{array}{c}OR_1\\R\\R'\end{array}$$

| X | R = R': | $R_1$: | b.p.°C | Refrac. Index $n_{25}^D$ | IR |
|---|---|---|---|---|---|
| Cl | $\langle C_6H_5\rangle-$ | $CH_3-$ | viscous liquid | — | Ar.C=C-1580<br>-1460<br>SiO-1100 |
| Cl | $\langle C_6H_5\rangle-$ | $HOCH_2CH_2OCH_2CH_2-$ | viscous liquid | — | HO-3400<br>Ar-1580-1460<br>SiO-1100 |
| Cl | $\langle C_6H_5\rangle-$ | $H(OCH_2CH_2\!\!-\!\!)_{4.5}$ | viscous liquid | — | HO-3400<br>Ar.C=C-1570<br>-1470<br>SiO-1100 |

What is claimed is:
1. Compounds of the formula

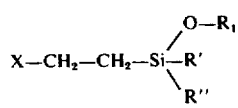

wherein X is chlorine or bromine; $R_1$ is selected from the group consisting of
polyether of the formula $-(C_nH_{2n}O)_y-R_4$ wherein $n = 2$ or $3$, $y$ may be any integer from 2 to 100, and $R_4$ is a terminal group selected from the group consisting of hydrogen, alkyl, phenyl, chlorophenyl, benzyl and chlorobenzyl;
and ketal; and wherein $R'$ and $R''$ are each independently selected from the group consisting of alkyl, phenyl, chlorophenyl, benzyl and chlorobenzyl.

2. Compounds of the formula:

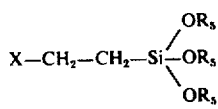

wherein X is chlorine or bromine; and wherein $R_5$ is a polyether of the formula $(-C_nH_{2n}O-)_y-R_4$ wherein $n=2$ or $3$, $y$ may be any integer from 2 to 100, and $R_4$ is a terminal group selected from the group consisting of hydrogen, alkyl, phenyl, chlorophenyl, benzyl and chlorobenzyl.

3. The compound 2-chloroethyl-tris-{2-[2-(2-ethoxyethoxy)ethoxy]ethoxy}-silane of the formula:

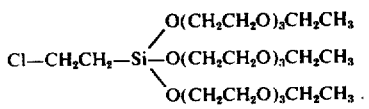

4. The compound 2-chloro-ethyl-tris-[2-(2-methoxyethoxy)ethoxy]-silane of the formula:

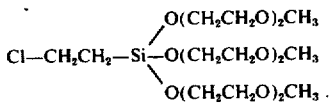

5. Compounds of the formula

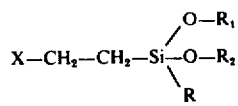

wherein X is chlorine or bromine; R is chloro-, alkyl, phenyl, chlorophenyl, benzyl, chlorobenzyl or the radical $-OR_3$; and wherein $R_1$, $R_2$ and $R_3$ are each independently selected from the group consisting of
polyether of the formula $-(C_nH_{2n}O)_y-R_4$ wherein $n = 2$ or $3$, $y$ may be any integer from 2 to 100, and $R_4$ is a terminal group selected from the group consisting of hydrogen, alkyl, phenyl, chlorophenyl, benzyl and chlorobenzyl;
and ketal.

* * * * *